United States Patent
Kim et al.

(10) Patent No.: US 10,605,960 B2
(45) Date of Patent: Mar. 31, 2020

(54) ANTIREFLECTION FILM CONTAINING INORGANIC PARTICLES AND MANUFACTURING METHOD THEREOF

(71) Applicant: LG CHEM, LTD., Seoul (KR)

(72) Inventors: Jae Young Kim, Daejeon (KR); Jin Seok Byun, Daejeon (KR); Yeong Rae Chang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 131 days.

(21) Appl. No.: 15/747,084

(22) PCT Filed: Dec. 28, 2016

(86) PCT No.: PCT/KR2016/015419
§ 371 (c)(1),
(2) Date: Jan. 23, 2018

(87) PCT Pub. No.: WO2017/122953
PCT Pub. Date: Jul. 20, 2017

(65) Prior Publication Data
US 2018/0372917 A1 Dec. 27, 2018

(30) Foreign Application Priority Data

Jan. 13, 2016 (KR) ......................... 10-2016-0004392

(51) Int. Cl.
*G02B 1/10* (2015.01)
*G02B 1/115* (2015.01)
(Continued)

(52) U.S. Cl.
CPC ............... *G02B 1/115* (2013.01); *B32B 7/02* (2013.01); *B32B 27/08* (2013.01); *B32B 27/18* (2013.01);
(Continued)

(58) Field of Classification Search
CPC ... G02B 1/00; G02B 1/04; G02B 1/08; G02B 1/10; G02B 1/105; G02B 1/11;
(Continued)

(56) References Cited

U.S. PATENT DOCUMENTS 8,422,133 B2 * 4/2013 Horio ....................... C08J 7/042
359/585
8,617,693 B2 12/2013 Isono et al.
(Continued)

FOREIGN PATENT DOCUMENTS

EP 3 248 776 A1 11/2017
JP 2001-233611 A 8/2001
(Continued)

OTHER PUBLICATIONS

Japanese document found at: http://warp.da.ndl.go.jp/info:ndljp/pid/10977616/www.meti.go.jp/policy/chemical_management/files/nanomaterial/150626SiO3.pdf.
(Continued)

*Primary Examiner* — Arnel C Lavarias
(74) *Attorney, Agent, or Firm* — Dentons US LLP

(57) ABSTRACT

An antireflection film including a hard coating layer; and a low refractive index layer including a binder resin and hollow and solid-type inorganic nanoparticles dispersed in the binder resin. The solid-type inorganic nanoparticles are distributed more than the hollow inorganic nanoparticles near the interface between the hard coating layer and the low refractive index layer. The hollow inorganic nanoparticles have a thickness of a shell layer to a particle radius ratio of 0.3 or less. A method for manufacturing an antireflection film including: coating a resin composition including a photocurable compound or a (co)polymer thereof, a fluorine-containing compound containing a photoreactive functional group, a photoinitiator, and hollow and solid-type
(Continued)

inorganic nanoparticles onto a hard coating layer, drying at a temperature of 35° C. to 100° C. and photocuring the same. The hollow inorganic nanoparticles have a ratio of the thickness of a shell layer to the particle radius of 0.3 or less.

20 Claims, 4 Drawing Sheets

(51) Int. Cl.

| | | |
|---|---|---|
| *B32B 7/02* | (2019.01) | |
| *B32B 38/00* | (2006.01) | |
| *B32B 27/18* | (2006.01) | |
| *B32B 27/08* | (2006.01) | |
| *G02B 1/11* | (2015.01) | |
| *G02F 1/1335* | (2006.01) | |
| *G02B 5/02* | (2006.01) | |
| *G02B 1/14* | (2015.01) | |
| *C09D 5/00* | (2006.01) | |

(52) U.S. Cl.
CPC ............ *B32B 38/00* (2013.01); *C09D 5/006* (2013.01); *G02B 1/11* (2013.01); *G02B 1/14* (2015.01); *G02B 5/0242* (2013.01); *G02F 1/133502* (2013.01)

(58) Field of Classification Search
CPC ......... G02B 1/111; G02B 1/113; G02B 1/115; G02B 1/118; G02B 1/12; G02B 1/14; G02B 5/20; G02B 5/206; G02B 5/28; G02B 5/281; G02B 5/283; G02B 5/285; G02B 5/287; G02B 5/30; G02B 27/28; B32B 7/02; C09D 5/006
USPC ......... 359/483.01, 488.01, 489.01, 577, 580, 359/581, 582, 586, 588, 589, 590
See application file for complete search history.

(56) References Cited

U.S. PATENT DOCUMENTS

| | | | | |
|---|---|---|---|---|
| 8,877,287 | B2 * | 11/2014 | Kim | ......................... B32B 7/02 427/180 |
| 2008/0032053 | A1 | 2/2008 | Kourtakis et al. | |
| 2011/0217541 | A1 | 9/2011 | Shimano et al. | |
| 2012/0200933 | A1 | 8/2012 | Akiyama et al. | |
| 2013/0135726 | A1 | 5/2013 | Wakizaka et al. | |
| 2013/0216818 | A1 | 8/2013 | Kim et al. | |
| 2014/0153099 | A1 | 6/2014 | Ogane | |
| 2015/0023643 | A1 * | 1/2015 | Chartoff | ................... C08K 3/30 385/124 |
| 2018/0231688 | A1 * | 8/2018 | Byun | ..................... G02B 1/111 |

FOREIGN PATENT DOCUMENTS

| | | |
|---|---|---|
| JP | 2007-121993 A | 5/2007 |
| JP | 2007-316213 A | 12/2007 |
| JP | 2009-037064 A | 2/2009 |
| JP | 2010-83047 A | 4/2010 |
| JP | 2011-088787 A | 5/2011 |
| JP | 2013-41275 A | 2/2013 |
| JP | 2013-097356 A | 5/2013 |
| JP | 2013-130865 A | 7/2013 |
| JP | 2014-529762 A | 11/2014 |
| KR | 10-2009-0041854 A | 4/2009 |
| KR | 10-2010-0039869 A | 4/2010 |
| KR | 10-2010-0045997 A | 5/2010 |
| KR | 10-2013-0120223 A | 11/2013 |
| KR | 10-2014-0006922 A | 1/2014 |
| WO | 2012/157682 A1 | 11/2012 |
| WO | 2012147527 A1 | 11/2012 |

OTHER PUBLICATIONS

Japanese document found at: http://warp.da.ndl.go.jp/info:ndljp/pid/10977616/www.meti.go.jp/policy/chemical_management/files/nanomaterial/150626SiO 2.pdf with attached Degussa AG: "Technical Bulletin—Fine Particles", Nippon Aerosil, No. 11.
Nissan Chemical Corporation, Inorganic Materials: "Organosilicasol", Product List. Japanese document found at: https://www.nissanchem.co.jp/products/materials/inorganic/ products/02_.pdf.

* cited by examiner

[FIG. 1]
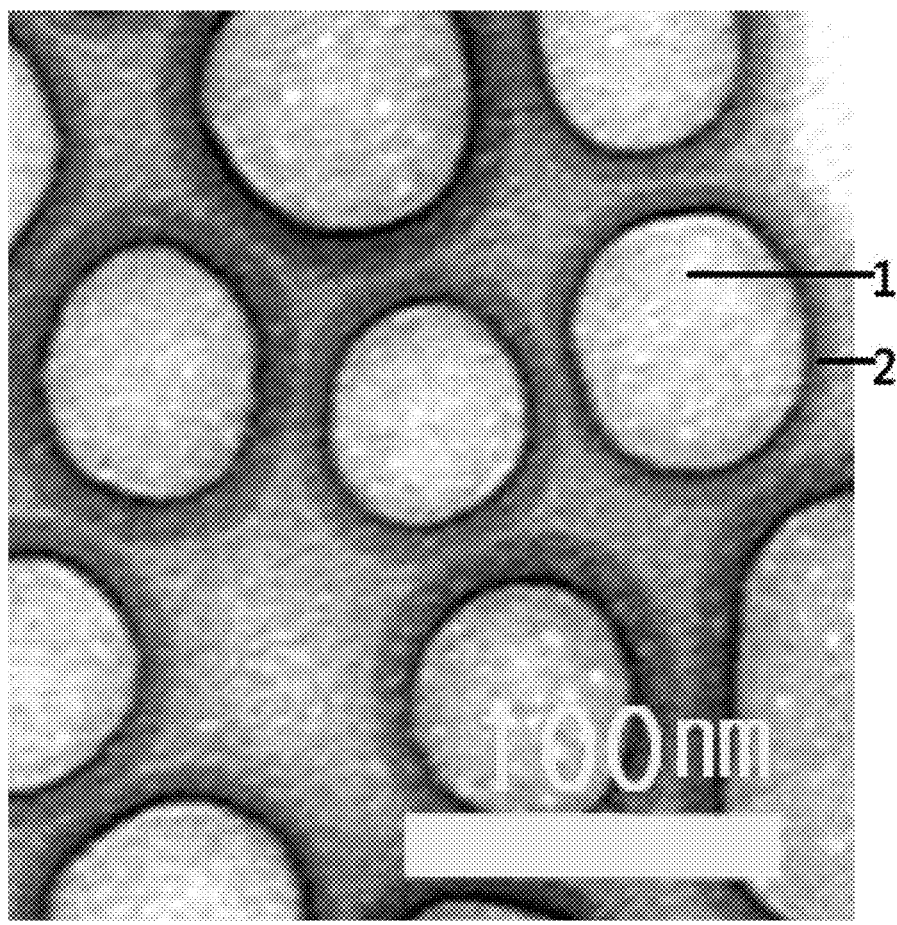

[FIG. 2]
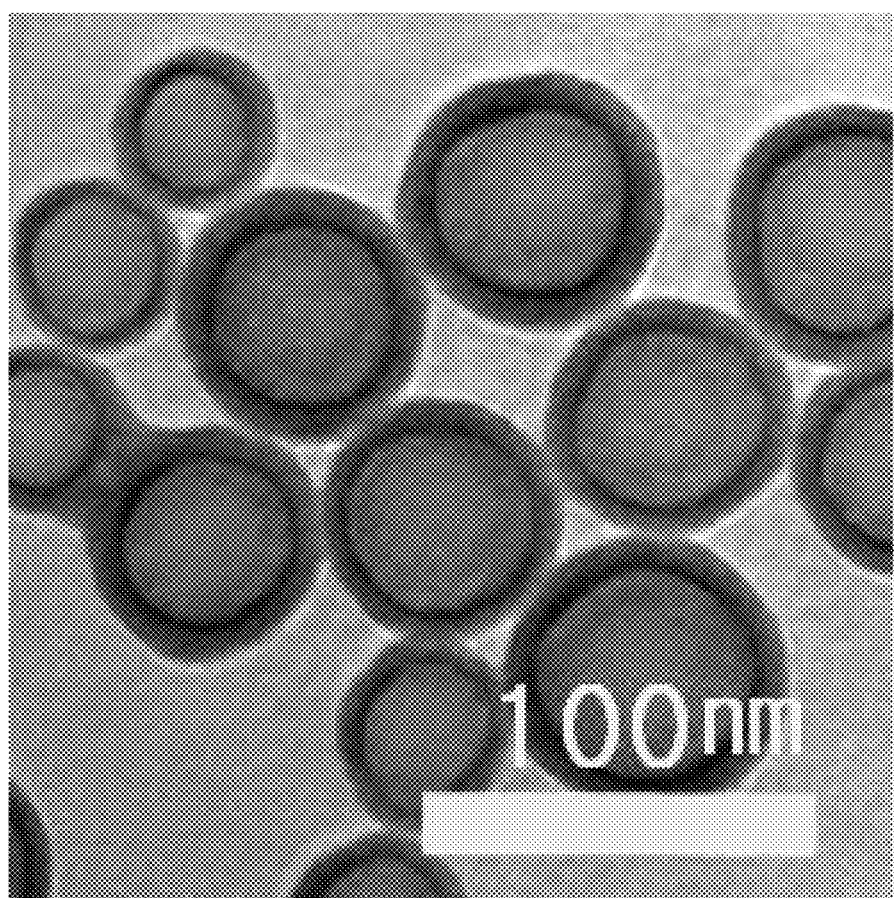

[FIG. 3]
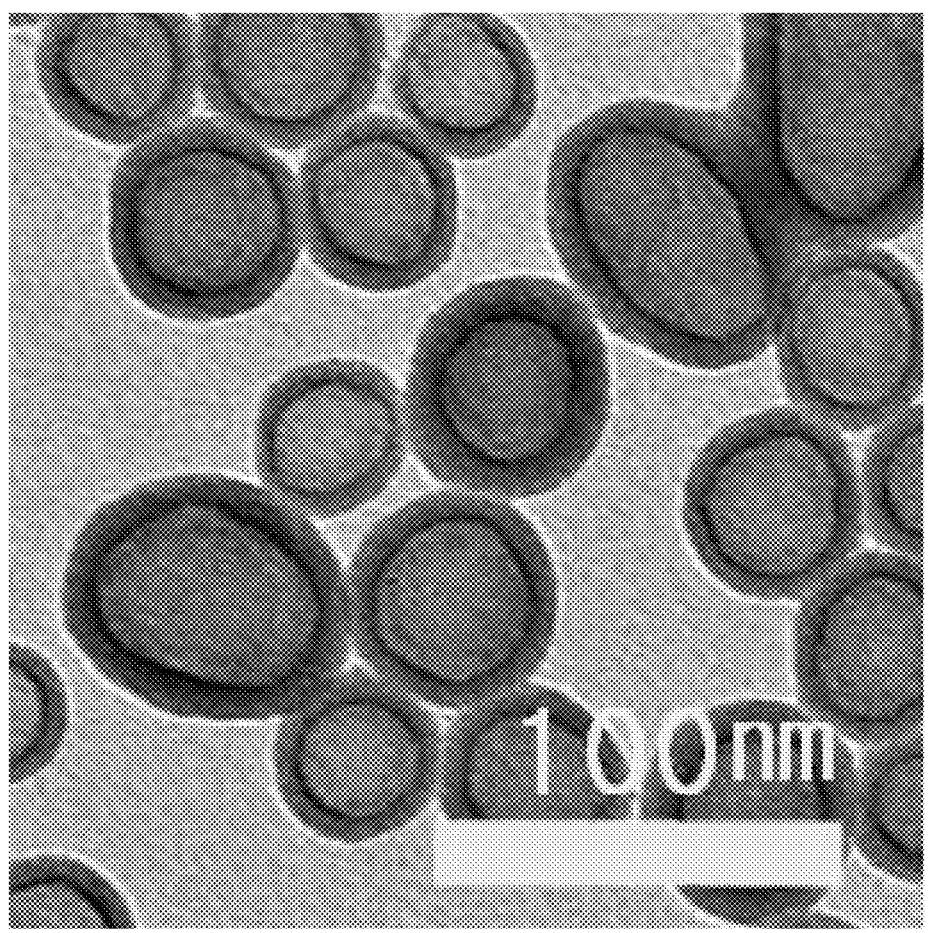

[FIG. 4]
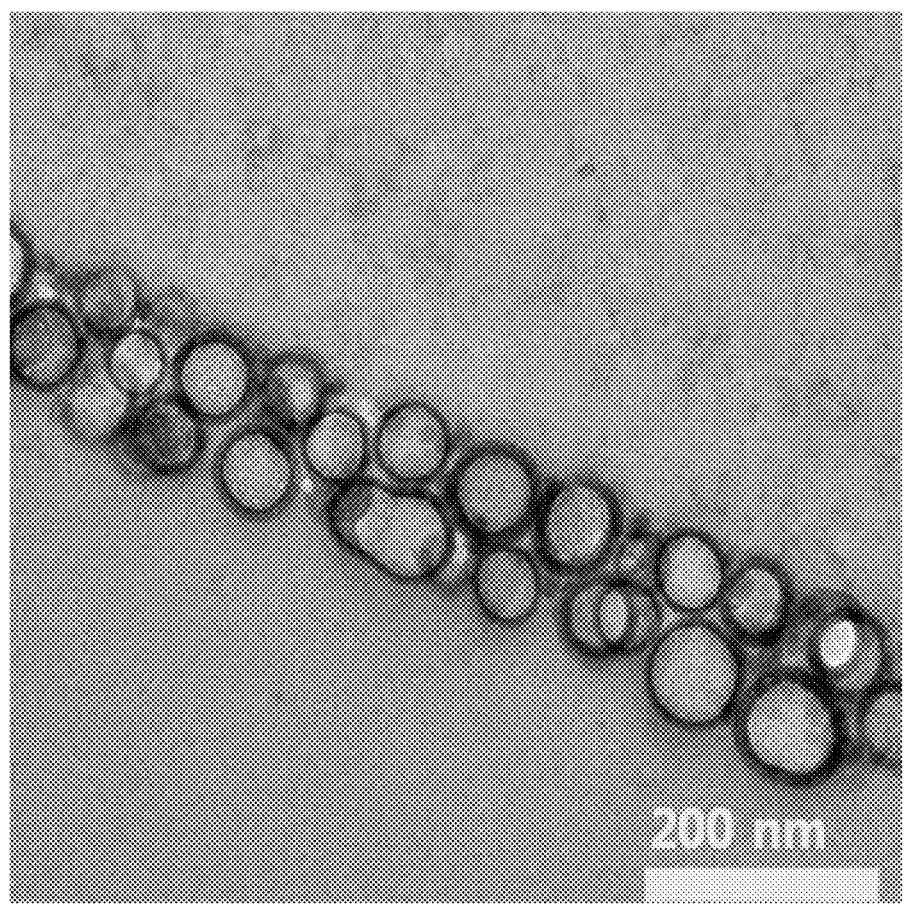

ANTIREFLECTION FILM CONTAINING INORGANIC PARTICLES AND MANUFACTURING METHOD THEREOF

CROSS-REFERENCE TO RELATED APPLICATION(S)

This application is a National Stage Application of International Application No. PCT/KR2016/015419 filed on Dec. 28, 2016, which claims the benefit of Korean Patent Application No. 10-2016-0004392 filed on Jan. 13, 2016, all of which are hereby incorporated by reference in their entirety for all purposes as if fully set forth herein.

TECHNICAL FIELD

The present invention relates to an antireflection film and a manufacturing method thereof. More specifically, the present invention relates to an antireflection film capable of implementing high scratch resistance and antifouling property simultaneously while having low reflectivity and high light transmittance, and capable of enhancing the screen sharpness of a display device, and a method of manufacturing the antireflection film.

BACKGROUND ART

In general, a flat panel display device such as a PDP or a LCD is equipped with an antireflection film for minimizing the reflection of light incident from the outside.

As a method for minimizing the reflection of light, there exists a method (anti-glare: AG coating) in which a filler such as an inorganic fine particle is dispersed in a resin and coated onto a substrate film to impart irregularities; a method (anti-reflection: AR coating) of using the interference of light by forming a plurality of layers having different refractive indexes on a substrate film; or a method for mixing them, etc.

Among them, in the case of the AG coating, the absolute amount of the reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have been conducted recently.

As for a film using the AR coating, a multi-layer structure in which a hard coating layer (high refractive index layer), a low reflective coating layer, and the like are laminated on a substrate film has been commercialized. However, the method of forming a plurality of layers as described above has disadvantages in that as the process for forming each layer is performed separately, the interlayer adhesion force (interfacial adhesion) is weak and the scratch resistance is low.

In addition, conventionally, in order to improve the scratch resistance of the low refractive index layer included in the antireflection film, a method of adding various particles in the size of nanometers (for example, particles of silica, alumina, zeolite, etc.) had been mainly attempted. However, when the particles in the size of nanometers were used as described above, there was a limitation in increasing the scratch resistance simultaneously while lowering the reflectivity of the low refractive index layer, and the antifouling property of the surface of the low refractive index layer was greatly reduced due to the nanometer-sized particles.

Accordingly, although many studies have been actively conducted to reduce the absolute reflection amount of light incident from the outside and to improve scratch resistance of the surface as well as to improve the antifouling property, the degree of improvement on the physical properties is insufficient.

DISCLOSURE

Technical Problem

It is one object of the present invention to provide an antireflection film capable of implementing high scratch resistance and antifouling property simultaneously while having low reflectivity and high light transmittance, and capable of enhancing the screen sharpness of a display device.

It is another object of the present invention to provide a manufacturing method for providing the antireflection film having the characteristics described above.

Technical Solution

In one embodiment of the present disclosure, there is provided an antireflection film comprising a hard coating layer; and a low refractive index layer which is formed on one surface of the hard coating layer and which includes a binder resin, and hollow inorganic nanoparticles and solid-type inorganic nanoparticles dispersed in the binder resin, wherein at least 70% by volume of the total solid-type inorganic nanoparticles exists within 50% of the total thickness of the low refractive index layer from the interface between the hard coating layer and the low refractive index layer, and wherein the hollow inorganic nanoparticles have a ratio of thickness of a shell layer 2 to particle radius of 0.3 or less, according to the following Equation 1:

$$\text{Ratio of thickness of the shell layer 2 to radius of the hollow inorganic nanoparticles} = (\text{Thickness of the shell layer 2 of the hollow inorganic nanoparticles})/(\text{Radius of the hollow inorganic nanoparticles}). \quad [\text{Equation 1}]$$

In another embodiment of the present invention, there is provided a method for manufacturing the antireflection film comprising the steps of: coating a resin composition for forming a low refractive-index layer including a photocurable compound or a (co)polymer thereof, a fluorine-containing compound containing a photoreactive functional group, a photoinitiator, hollow inorganic nanoparticles and solid-type inorganic nanoparticles onto a hard coating layer and drying at a temperature of 35° C. to 100° C.; and photocuring the dried-product of the resin composition, wherein the hollow inorganic nanoparticles have a ratio of thickness of a shell layer 2 to particle radius of 0.3 or less according to the Equation 1.

Hereinafter, the antireflection film and the method for manufacturing the antireflection film according to specific embodiments of the present invention will be described in more detail.

In the present disclosure, the photopolymerizable compound collectively refers to a compound which causes a polymerization reaction when irradiated with a light, for example, when irradiated with a visible light or ultraviolet light.

Further, the fluorine-containing compound refers to a compound containing at least one fluorine element in the compound.

Further, the (meth)acryl may include both acryl and methacryl.

Furthermore, the (co)polymer may include both a co-polymer and a homo-polymer.

Moreover, hollow silica particles refer to silica particles derived from a silicon compound or an organosilicon compound, in which voids are present on the surface and/or inside of the silica particles. Specifically, the hollow silica particles have a core-shell structure including a core portion 1 including pores, and a shell layer 2, which is formed on the surface of the core portion 1 and which contains a siloxane-based compound. The shell layer was used in a sense like a shell.

According to one embodiment of the present invention, there may be provided a an antireflection film comprising a hard coating layer; and a low refractive index layer which is formed on one surface of the hard coating layer and which includes a binder resin, and hollow inorganic nanoparticles and solid-type inorganic nanoparticles dispersed in the binder resin, wherein at least 70% by volume of the total solid-type inorganic nanoparticles exists within 50% of the total thickness of the low refractive index layer from the interface between the hard coating layer and the low refractive index layer, and wherein the hollow inorganic nanoparticles have a ratio of thickness of a shell layer 2 to particle radius of 0.3 or less, according to the following Equation 1:

Ratio of thickness of the shell layer 2 to radius of the hollow inorganic nanoparticles=(Thickness of the shell layer 2 of the hollow inorganic nanoparticles)/(Radius of the hollow inorganic nanoparticles). [Equation 1]

Conventionally, in order to increase the scratch resistance of the antireflection film, inorganic particles were added in an excessive amount, but there existed a limitation in increasing the scratch resistance of the antireflection film, and a problem that the reflectivity and antifouling property were rather deteriorated.

Accordingly, the present inventors conducted intensive studies on the antireflection film and found through experiments that the reflectivity can be effectively reduced by increasing the porosity in the low refractive index layer by controlling the structure of the hollow inorganic nanoparticles included in the low refractive index layer of the antireflection film, thereby completing the present invention.

Specifically, through a concrete manufacturing method described below, a desired low reflectivity can be achieved, while using a smaller amount of hollow inorganic nanoparticles than before, by reducing the ratio of thickness of the shell layer 2 to the particle radius of the hollow inorganic nanoparticles contained in the low refractive index layer of the antireflection film and controlling the value to have a relatively large particle radius value and a small thickness value of the shell layer 2.

In particular, the durability of the antireflection film can be improved by minimizing the content of the hollow inorganic nanoparticles, while implementing excellent antireflection properties by lowering the reflectivity to a desired value.

In addition, when the hollow inorganic nanoparticles and the solid-type inorganic nanoparticles are distributed such that they can be distinguished from each other in the low refractive index layer included in the antireflection film, it is possible to implement high scratch resistance and antifouling property simultaneously while having low reflectivity and high light transmittance.

Specifically, through a concrete manufacturing method described below, when the solid-type inorganic nanoparticles are mainly distributed near the interface between the hard coating layer and the low refractive index layer in the low refractive index layer of the antireflection film and the hollow inorganic nanoparticles are mainly distributed on the opposite surface of the interface, a reflectivity lower than the actual reflectivity that could be conventionally obtained using inorganic particles can be achieved, and also, the low refractive index layer can implement greatly improved scratch resistance and antifouling property.

More specifically, the antireflection film of one embodiment may include a hard coating layer; and a low refractive index layer which is formed on one side of the hard coating layer and which includes a binder resin, and hollow inorganic nanoparticles and solid-type inorganic nanoparticles dispersed in the binder resin.

The hollow inorganic nanoparticles included in the low refractive index layer may include a core portion 1 including pores and a shell layer 2, which is formed on the surface of the core portion 1 and which includes a siloxane-based compound. Specifically, as shown in FIG. 1, the hollow inorganic nanoparticle may have a core-shell structure in the shape of a sphere or almost sphere in which core portions 1,1 including pores on the inside, and shell layers 2,2 surrounding the core portions 1,1 on the surface of the core portions 1,1 are formed.

The siloxane-based compound included in the shell layer 2 may include siloxane compounds containing siloxane bonds within the molecular structure and derivatives thereof. Herein, as a broad concept, the compound may be a single compound or a polymer or copolymer macromolecule.

The derivative refers to a similar compound obtained by chemically modifying a part of the compound, and usually refers to a compound in which a hydrogen atom or a specific atomic group in the compound is substituted by another atom or atomic group.

Specifically, the derivatives may include a substitutable compound in which at least one hydrogen atom contained in the siloxane compound is replaced with a specific functional group, or an ionic compound having the form of a salt. Examples of the functional groups are not particularly limited, and various functional groups or atomic groups widely known in the art can be used without limitation.

Examples of the substituted atom or atomic group include an alkyl group having 1 to 50 carbon atoms, an alkenyl group having 2 to 50 carbon atoms, an alkynyl group having 2 to 50 carbon atoms, an aryl group having 6 to 50 carbon atoms, a heteroaryl group having 6 to 50 carbon atoms, an arylalkyl group having 6 to 50 carbon atoms, a halogen atom, a cyano group, an amino group, an amidino group, a nitro group, an amide group, a carbonyl group, a hydroxyl group, a sulfonyl group, a carbamate group, an alkoxy group having 1 to 50 carbon atoms, or a halogen-substituted alkoxy group having 1 to 50 carbon atoms, and the like.

Herein, the hollow inorganic nanoparticles may have a ratio of the thickness of the shell layer 2 to the particle radius of 0.3 or less, 0.0001 to 0.3, or 0.001 to 0.3, according to the Equation 1.

Ratio of thickness of the shell layer 2 to radius of the hollow inorganic nanoparticles=(Thickness of the shell layer 2 of the hollow inorganic nanoparticles)/(Radius of the hollow inorganic nanoparticles). [Equation 1]

The particle radius refers to the sum of the thickness of the core portion 1 and the thickness of the shell layer 2. In addition, the thickness of the core portion 1 refers to a distance from the inner center of the core portion 1 to the shell layer 2.

As the ratio of the thickness of the shell layer 2 to the particle radius according to the Equation 1 satisfies the ratio of 0.3 or less, the volume of the pores included in the core portion 1 of the hollow inorganic nanoparticles is increased and the refractive index of the hollow inorganic nanoparticles is sufficiently lowered, thereby implementing excellent antireflection properties.

In contrast, if the ratio of the thickness of the shell layer 2 to the particle radius according to the Equation 1 is excessively increased to be larger than 0.3, the volume of the pores included in the core portion 1 of the hollow inorganic nanoparticles is excessively reduced and thus refractive index of the hollow inorganic nanoparticles is increased and the reflectivity is increased, thereby making it difficult to implement effective antireflection properties, and reducing the scratch resistance of the antireflection film.

Specifically, the thickness of the shell layer 2 of the hollow inorganic nanoparticles may be 0.1 nm to 60 nm, or may be 0.1 nm to 30 nm. If the thickness of the shell layer 2 is excessively increased, the volume of the pores included in the core portion 1 of the hollow inorganic nanoparticles is excessively reduced and the reflectivity is increased, thus making it difficult to implement effective antireflection properties, and increasing the refractive index of the hollow inorganic nanoparticles.

Further, the particle radius of the hollow inorganic nanoparticles may be 35 nm to 100 nm, or may be 35 nm to 50 nm. If the particle radius of the hollow inorganic nanoparticles is excessively reduced to be less than 35 nm, the pore volume formed while the plurality of hollow inorganic nanoparticles become neighbors to each other is reduced and thereby the porosity of the low refractive index layer including the same is reduced, making it difficult to implement excellent antireflection properties.

The low refractive index layer includes a binder resin, and hollow inorganic nanoparticles and solid-type inorganic nanoparticles dispersed in the binder resin, and may be formed on one side of the hard coating layer, wherein at least 70% by volume of the total solid-type inorganic nanoparticles exists within 50% of the total thickness of the low refractive index layer from the interface between the hard coating layer and the low refractive index layer.

The 'at least 70% by volume of the total solid-type inorganic nanoparticles exists within a specific region' is defined as meaning that the solid-type inorganic nanoparticles are mostly present in a specific region in the cross section of the low refractive index layer, and specifically, at least 70% by volume of the total solid-type inorganic nanoparticles can be confirmed by measuring the volume of the total solid-type inorganic nanoparticles.

Whether the hollow inorganic nanoparticles and the solid-type inorganic nanoparticles are present in the specified region can be determined depending on whether each of the hollow inorganic nanoparticles or the solid-type inorganic nanoparticles exists within the specified region, except for the particles existing over the interface of the specific region.

Further, as described above, in the low refractive index layer, the hollow inorganic nanoparticles may be mainly distributed on the opposite surface of the interface between the hard coating layer and the low refractive index layer. Specifically, at least 30% by volume of the total hollow inorganic nanoparticles may exist farther from the interface between the hard coating layer and the low refractive index layer than the total solid-type inorganic nanoparticles in the thickness direction of the low refractive index layer.

More specifically, at least 70% by volume of the total solid-type inorganic nanoparticles may exist within 30% of the total thickness of the low refractive index layer from the interface between the hard coating layer and the low refractive index layer. Further, at least 70% by volume of the total hollow inorganic nanoparticles may exist in a region where the total thickness of the low refractive index layer exceeds by 30% from the interface between the hard coating layer and the low refractive index layer. As the solid-type inorganic nanoparticles are mainly distributed near the interface between the hard coating layer and the low refractive index layer, and the hollow inorganic nanoparticles are mainly distributed on a surface opposite to the interface in the low refractive index layer of the antireflection film, at least 2 potions or at least two layers having different refractive indices from each other may be formed in the low refractive index layer, and accordingly, the reflectivity of the antireflection film may be lowered.

In the low refractive index layer, the specific distribution of the solid-type inorganic nanoparticles and the hollow inorganic nanoparticles can be obtained by controlling the density difference between the solid-type inorganic nanoparticles and the hollow inorganic nanoparticles and controlling the drying temperature of the photocurable resin composition for forming a low refractive index layer including the 2 types of nanoparticles, in the concrete manufacturing method described below. Specifically, the density of the solid-type inorganic nanoparticles is 0.50 g/cm$^3$ or more, or 0.50 g/cm$^3$ to 2.00 g/cm$^3$, higher than the density of the hollow inorganic nanoparticles, and due to such a difference in density, the solid-type inorganic nanoparticles may be positioned closer to the hard coating layer side in the low refractive index layer formed on the hard coating layer.

When the solid-type inorganic nanoparticles are mainly distributed near the interface between the hard coating layer and the low refractive index layer and the hollow inorganic nanoparticles are mainly distributed on a surface opposite to the interface in the low refractive index layer of the antireflection film, it is possible to implement a reflectivity lower than that previously obtained using inorganic particles. Specifically, the antireflection film may exhibit an average reflectivity of 0.8% or less, or 0.3% to 0.8%, in the visible light wavelength range of 380 nm to 780 nm.

Meanwhile, in the antireflection film of the embodiment, the low refractive index layer may include a first layer including at least 70% by volume of the total solid-type inorganic nanoparticles and a second layer including at least 70% by volume of the total hollow inorganic nanoparticles, and the first layer may be positioned closer to the interface between the hard coating layer and the low refractive index layer than the second layer. As described above, in the low refractive index layer of the antireflection film, the solid-type inorganic nanoparticles are mainly distributed near the interface between the hard coating layer and the low refractive index layer, and the hollow inorganic nanoparticles are mainly distributed on the surface opposite to the interface, and it is possible to form an independent layer in which regions where each of the solid-type inorganic nanoparticles and the hollow inorganic nanoparticles are mainly distributed are visually confirmed within the low refractive index layer.

The solid-type inorganic nanoparticles refer to particles having a maximum radius of less than 100 nm and having no void therein.

The solid-type inorganic nanoparticles may have a radius of 0.5 nm to 100 nm, or 1 nm to 30 nm.

Meanwhile, each of the solid-type inorganic nanoparticles and the hollow inorganic nanoparticles may contain at least one reactive functional group selected from the group consisting of a (meth)acrylate group, an epoxide group, a vinyl group and a thiol group on the surface thereof. As each of the solid-type inorganic nanoparticles and the hollow inorganic nanoparticles contains the above-described reactive functional group on the surface thereof, the low refractive index layer can have a higher degree of crosslinking, thereby ensuring more improved scratch resistance and antifouling property.

Meanwhile, the above-mentioned low refractive index layer may be prepared from a photocurable coating composition including a photopolymerizable compound, a fluorine-containing compound containing a photoreactive functional group, hollow inorganic nanoparticles, solid-type inorganic nanoparticles, and a photoinitiator.

Accordingly, the binder resin included in the low refractive index layer may include a crosslinked (co)polymer between a (co)polymer of a photopolymerizable compound and a fluorine-containing compound containing a photoreactive functional group.

The photopolymerizable compound included in the photocurable coating composition of the embodiment can form a substrate of the binder resin of the low refractive index layer to be manufactured. Specifically, the photopolymerizable compound may include a monomer or oligomer containing a (meth)acrylate or vinyl group. More specifically, the photopolymerizable compound may include a monomer or oligomer containing one or more or two or more, or three or more of (meth)acrylates or vinyl groups.

Specific examples of the monomer or oligomer containing (meth)acrylate include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or urethane-modified acrylate oligomer, epoxide acrylate oligomer, ether acrylate oligomer, dendritic acrylate oligomer, or a mixture of two or more thereof. Herein, the molecular weight of the oligomer is preferably 1,000 to 10,000.

Specific examples of the monomer or oligomer containing a vinyl group include divinylbenzene, styrene, or para-methyl styrene.

The content of the photopolymerizable compound in the photocurable coating composition is not particularly limited. However, considering the mechanical properties of the finally manufactured low refractive index layer and the antireflection film, or the like, the content of the photopolymerizable compound in the solid content of the photocurable coating composition may be 5% by weight to 80% by weight. The solid content of the photocurable coating composition refers only to the solid components, excluding the liquid components in the photocurable coating composition, for example, organic solvents or the like, which may be optionally included as described below.

Meanwhile, the photopolymerizable compound may further include a monomer or oligomer of a fluorine-based (meth)acrylate-based compound, in addition to the monomer or oligomer described above. When the monomer or oligomer of the fluorine-based (meth)acrylate-based compound is further included, the weight ratio of the monomer or oligomer of the fluorine-based (meth)acrylate-based compound to the monomer or oligomer containing a (meth)acrylate or vinyl group may be 0.1% by weight to 10% by weight.

Specific examples of the monomer or oligomer of the fluorine-based (meth)acrylate-based compound include at least one compound selected from the group consisting of the following Chemical Formulae 1 to 5.

[Chemical Formula 1]

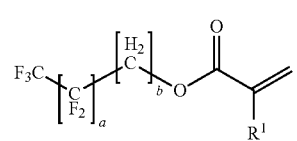

in the above Chemical Formula 1, $R^1$ is a hydrogen group, or an alkyl group having 1 to 6 carbon atoms, a is an integer of 0 to 7, and b is an integer of 1 to 3.

[Chemical Formula 2]

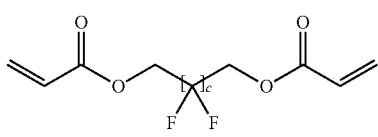

in the above Chemical Formula 2, c is an integer of 1 to 10.

[Chemical Formula 3]

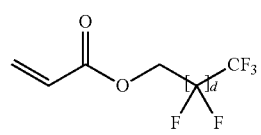

in the above Chemical Formula 3, d is an integer of 1 to 11.

[Chemical Formula 4]

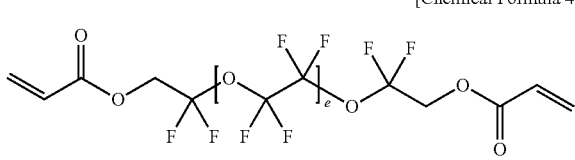

in the above Chemical Formula 4, e is an integer of 1 to 5.

[Chemical Formula 5]

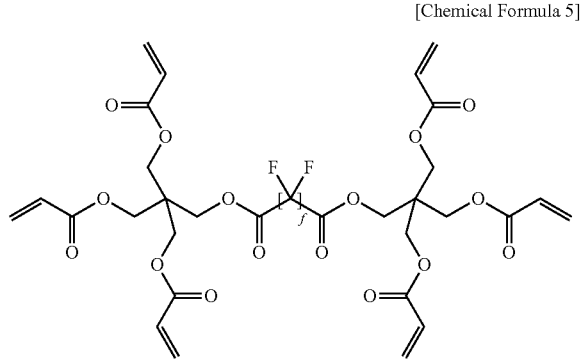

in the above Chemical Formula 5, f is an integer of 4 to 10.

Meanwhile, the low refractive index layer may include a portion derived from the fluorine-containing compound containing a photoreactive functional group.

The fluorine-containing compound containing a photoreactive functional group may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-containing compound containing a photoreactive functional group may each have a weight-average molecular weight of 2,000 g/mol to 200,000 g/mol, preferably 5,000 g/mol to 100,000 g/mol (weight-average molecular weight in terms of polystyrene measured by GPC method).

If the weight-average molecular weight of the fluorine-containing compound containing a photoreactive functional group is too small, the fluorine-containing compounds in the photocurable coating composition cannot be uniformly and effectively aligned on the surface and are positioned inside of the finally manufactured low refractive index layer. Accordingly, the antifouling property of the surface of the low refractive index layer is reduced, and the crosslinking density of the low refractive index layer is lowered, thereby deteriorating the mechanical properties, such as the overall strength and scratch resistance.

Further, when the weight-average molecular weight of the fluorine-containing compound containing a photoreactive functional group is too large, the compatibility with other components in the photocurable coating composition may be lowered, and accordingly, the haze of the finally manufactured low refractive index layer may increase or the light transmittance may decrease, and the strength of the low refractive index layer may also decrease.

Specifically, the fluorine-containing compound containing a photoreactive functional group may be i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, polydimethylsiloxane-based polymer) in which at least one photoreactive functional group is substituted and at least one fluorine is substituted on at least one silicon; iv) a polyether compound in which at least one photoreactive functional group is substituted and at least one hydrogen is substituted with fluorine; or a mixture of two or more of i) to iv), or a copolymer thereof.

The photocurable coating composition may contain 50 to 100 parts by weight, or 80 to 500 parts by weight of the fluorine-containing compound containing a photoreactive functional group based on 100 parts by weight of the photopolymerizable compound.

If the fluorine-containing compound containing a photoreactive functional group is added in excess relative to the photopolymerizable compound, the coating property of the photocurable coating composition of the embodiment may be reduced, or the low refractive index layer obtained from the photocurable coating composition may not have sufficient durability or scratch resistance. Further, if the amount of the fluorine-containing compound containing a photoreactive functional group is too small relative to the photopolymerizable compound, the low refractive index layer obtained from the photocurable coating composition may not have sufficient mechanical properties, such as antifouling property or scratch resistance, etc.

The fluorine-containing compound containing a photoreactive functional group may further include silicon or a silicon compound. That is, the fluorine-containing compound containing a photoreactive functional group may optionally contain silicon or a silicon compound, and specifically, the content of silicon in the fluorine-containing compound containing a photoreactive functional group may be 0.1% by weight to 20% by weight.

The silicon contained in the fluorine-containing compound containing a photoreactive functional group may increase the compatibility with other components included in the photocurable coating composition of the embodiment, and accordingly may serve to increase transparency by preventing the generation of haze in the finally manufactured refractive index layer. Meanwhile, if the content of silicon in the fluorine-containing compound containing a photoreactive functional group becomes too large, the compatibility between other components included in the photocurable coating composition and the fluorine-containing compound may rather be reduced, and accordingly, the finally manufactured low refractive index layer or antireflection film may not have sufficient transparency or antireflection performance, which may also decrease the antifouling property of the surface.

The low refractive index layer may include 10 to 1000 parts by weight, or 100 to 1000 parts by weight, or 150 to 900 parts by weight of the hollow inorganic nanoparticles, and 50 to 200 parts by weight, or 80 to 150 parts by weight of the solid-type inorganic nanoparticles, relative to 100 parts by weight of the (co)polymer of the photopolymerizable compound.

If the content of the hollow inorganic nanoparticles in the low refractive index layer is excessively increased, the durability of the finally manufactured antireflection film may decrease. If the content of the hollow inorganic nanoparticles is excessively decreased, it may be difficult to sufficiently decrease the reflectivity of the antireflection film.

Further, if the contents of the hollow inorganic nanoparticles and the solid-type inorganic nanoparticles in the low refractive index layer become excessively large, the phase separation between the hollow inorganic nanoparticles and the solid-type inorganic nanoparticles does not sufficiently occur during the manufacturing process of the low refractive index layer, and they may rather be mixed, thereby increasing the reflectivity, and the antifouling property may be deteriorated as the surface irregularities may be excessively generated. Furthermore, if the content of the hollow inorganic nanoparticles and the solid-type inorganic nanoparticles in the low refractive index layer is too small, it is difficult for the majority of the solid-type inorganic nanoparticles to be positioned in a region close to the interface between the hard coating layer and the low refractive index layer, and the reflectivity of the low refractive index layer can be greatly increased.

The low refractive index layer may have a thickness of 1 nm to 300 nm, or 50 nm to 200 nm.

Meanwhile, as the hard coating layer, a commonly known hard coating layer can be used without particular limitation.

One example of the hard coating film includes a hard coating film including a binder resin of a photocurable resin; and an antistatic agent dispersed in the binder resin.

The photocurable resin included in the hard coating layer may be a photocurable compound capable of causing a polymerization reaction when irradiated with a light, such as an ultraviolet light or the like, and may be conventional ones in the art. However, preferably, the photocurable compound may be a polyfunctional (meth)acrylate-based monomer or oligomer. In this case, it is advantageous that the number of (meth)acrylate-based functional groups has 2 to 10, preferably 2 to 8, more preferably, 2 to 7 in terms of securing the physical properties of the hard coating layer. More preferably, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trylene diisocyanate, xylene diisocyanate, hexamethylene diisocyanate, trimethylolpropane tri(meth)acrylate, and trimethylolpropane polyethoxy tri(meth)acrylate.

The antistatic agent may be quaternary ammonium salt compounds; pyridinium salts; cationic compounds having 1 to 3 amino groups; anionic compounds such as sulfonic acid base, sulfuric ester base, phosphoric ester base, phosphonic acid base and the like; amphoteric compounds such as amino acid-based or aminosulfuric-based compounds; nonionic compounds such as imino alcohol-based compounds, glycerin-based compounds, polyethylene glycol-based compounds and the like; organometallic compounds such as metal alkoxide compounds including tin or titanium and the like; metal chelate compounds such as an acetylacetonate salt of the organometallic compounds; two or more reactants or polymers of such compounds; and a mixture of two or more of these compounds. Herein, the quaternary ammonium salt compound may be a compound having at least one quaternary ammonium salt group in the molecule, and a low-molecule type or a high-molecule type can be used without limitation.

Further, as the antistatic agent, a conductive polymer and metal oxide fine particles may also be used. The conductive polymer may include aromatic conjugated poly(paraphenylene), heterocyclic conjugated polypyrrole, polythiophene, aliphatic conjugated polyacetylene, conjugated polyaniline containing a hetero atom, mixed-type conjugated poly(phenylenevinylene), conjugated double-chain type conjugated compound having a plurality of conjugated chains in the molecule, a conductive complex obtained by graft or block copolymerization of a conjugated polymer chain with a saturated polymer, and the like. Furthermore, the metal oxide fine particles include zinc oxide, antimony oxide, tin oxide, cerium oxide, indium tin oxide, indium oxide, aluminum oxide, antimony doped-tin oxide, aluminum doped-zinc oxide, and the like.

The hard coating film including a binder resin of the photocurable resin; and an antistatic agent dispersed in the binder resin may further include at least one compound selected from the group consisting of an alkoxysilane-based oligomer and a metal alkoxide-based oligomer.

The alkoxysilane-based compound may be one that is conventional in the art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer.

However, since the metal alkoxide-based compound can rapidly react with water, the sol-gel reaction can be performed by diluting the metal alkoxide-based compound in an organic solvent and slowly dropping water. At this time, considering the reaction efficiency or the like, the molar ratio (based on metal ion) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The hard coating layer may have a thickness of 0.1 μm to 100 μm.

A substrate bonded to the other surface of the hard coating layer may further be included. The specific kind and thickness of the substrate are not particularly limited, and a substrate known to be used in the manufacture of a low refractive index layer or an antireflection film can be used without particular limitation.

Meanwhile, according to another embodiment of the present invention, there may be provided a method for manufacturing the antireflection film comprising the steps of: coating a resin composition for forming a low refractive index layer including a photocurable compound or a (co) polymer thereof, a fluorine-containing compound containing a photoreactive functional group, a photoinitiator, hollow inorganic nanoparticles and solid-type inorganic nanoparticles onto a hard coating layer and drying at a temperature of 35° C. to 100° C.; and photocuring the dried-product of the resin composition, wherein the hollow inorganic nanoparticles have a ratio of thickness of a shell layer 2 to particle radius of 0.3 or less according to the Equation 1 above.

The antireflection film of one embodiment described above can be provided through such a manufacturing method of the antireflection film.

Specifically, the antireflection provided by the manufacturing method of the antireflection film lowers the ratio of the thickness of the shell layer 2 to the particle radius of the hollow inorganic nanoparticles contained in the low refractive index layer of the antireflection film and control it to have a relatively large particle radius value and a small thickness value of the shell layer 2, thereby achieving the desired low reflectivity while using a small amount of hollow inorganic nanoparticles than before.

In particular, it is possible to improve the durability of the antireflection film by minimizing the content of the hollow inorganic nanoparticles while implementing excellent antireflection properties by lowering the reflectivity to the desired value.

In addition, in the antireflection film provided by the manufacturing method of the antireflection film, the hollow inorganic nanoparticles and the solid-type inorganic nanoparticles are distributed such that they can be distinguished from each other, thereby implementing high scratch resistance and antifouling property simultaneously while having low reflectivity and high light transmittance.

More specifically, the antireflection film includes a hard coating layer; and a low refractive index layer which is formed on one surface of the hard coating layer and which includes a binder resin, and hollow inorganic nanoparticles and solid-type inorganic nanoparticles dispersed in the binder resin, wherein at least 70% by volume of the total solid-type inorganic nanoparticles exists within 50% of the total thickness of the low refractive index layer from the interface between the hard coating layer and the low refractive index layer, and wherein the hollow inorganic nanoparticles have a ratio of thickness of a shell layer 2 to particle radius of 0.3 or less, or 0.0001 to 0.3, or 0.001 to 0.3 according to the following Equation 1:

Ratio of thickness of the shell layer 2 to radius of the hollow inorganic nanoparticles=(Thickness of the shell layer 2 of the hollow inorganic nanoparticles)/(Radius of the hollow inorganic nanoparticles). [Equation 1]

Further, at least 30% by volume of the total hollow inorganic nanoparticles may exist farther from the interface between the hard coating layer and the low refractive index layer than the total solid-type inorganic nanoparticles in the thickness direction of the low refractive index layer.

Furthermore, at least 70% by volume of the total solid-type inorganic nanoparticles may exist within 30% of the total thickness of the low refractive index layer from the interface between the hard coating layer and the low refractive index layer.

Moreover, at least 70% by volume of the total hollow inorganic nanoparticles may exist in a region where the total thickness of the low refractive index layer exceeds by 30% from the interface between the hard coating layer and the low refractive index layer.

In addition, in the antireflection film provided by the manufacturing method of the antireflection film, the low refractive index layer may include a first layer including at least 70% by volume of the total solid-type inorganic nanoparticles and a second layer including at least 70% by volume of the total hollow inorganic nanoparticles, wherein the first layer may be positioned closer to the interface between the hard coating layer and the low refractive index layer than the second layer.

The low refractive index layer can be formed by coating a resin composition for forming a low refractive index layer including a photocurable compound or a (co)polymer thereof, a fluorine-containing compound containing a photoreactive functional group, a photoinitiator, hollow inorganic nanoparticles and solid-type inorganic nanoparticles onto a hard coating layer and drying at a temperature of 35° C. to 100° C., or 40° C. to 80° C.

If the temperature for drying the resin composition for forming a low refractive index layer coated onto the hard coating layer is less than 35° C., the antifouling property of the low refractive index layer formed may be greatly reduced. Further, if the temperature for drying the resin composition for forming a low refractive index layer coated onto the hard coating layer exceeds 100° C., the phase separation between the hollow inorganic nanoparticles and the solid-type inorganic nanoparticles does not sufficiently occur during the manufacturing process of the low refractive index layer, and they may rather be mixed, thereby not only reducing the scratch resistance and antifouling property of the low refractive index layer, but also significantly increasing the reflectivity.

During the process of drying the resin composition for forming a low refractive index layer coated onto the hard coating layer, the low refractive index layer having the above-described properties can be formed by controlling the density difference between the solid-type inorganic nanoparticles and the hollow inorganic nanoparticles, as well as the drying temperature.

The solid-type inorganic nanoparticles may have a density higher than that of the hollow inorganic nanoparticles by at least 0.50 g/cm$^3$, or by 0.50 g/cm$^3$ to 2.00 g/cm$^3$, and due to such a density difference, the solid-type inorganic nanoparticles may be positioned closer to the hard coating layer side in the low refractive index layer formed on the hard coating layer.

Specifically, the solid-type inorganic nanoparticles may have a density of 2.00 g/cm$^3$ to 4.00 g/cm$^3$, and the hollow inorganic nanoparticles may have a density of 1.20 g/cm$^3$ to 3.50 g/cm$^3$.

Meanwhile, the step of drying the resin composition for forming a low refractive index layer coated onto the hard coating layer at a temperature of 35° C. to 100° C. may be performed for 10 seconds to 5 minutes or for 30 seconds to 4 minutes.

If the drying time is too short, the phase separation between the above-mentioned solid-type inorganic nanoparticles and hollow inorganic nanoparticles may not sufficiently occur. In contrast, if the drying time is too long, the low refractive index layer to be formed may erode the hard coating layer.

Meanwhile, the low refractive index layer may be prepared from a photocurable coating composition including a photopolymerizable compound, a fluorine-containing compound containing a photoreactive functional group, hollow inorganic nanoparticles, solid-type inorganic nanoparticles, and a photoinitiator.

In the photocurable coating composition, the hollow inorganic nanoparticles may be included in an amount of 10 to 1000 parts by weight or 100 to 1000 parts by weight, or 150 to 900 parts by weight, relative to 100 parts by weight of the photocurable compound or a (co)polymer thereof. If the content of the hollow inorganic nanoparticles is excessively increased, the durability of the finally manufactured antireflection film may be reduced. If the content of the hollow inorganic nanoparticles is excessively decreased, it may be difficult to sufficiently decrease the reflectivity of the antireflection film.

Further, in the photocurable coating composition, the solid-type inorganic nanoparticles may be included in an amount of 50 to 200 parts by weight or 80 to 150 parts by weight, relative to 100 parts by weight of the photocurable compound or a (co)polymer thereof.

The low refractive index layer can be obtained by coating the photocurable coating composition onto a predetermined substrate and photocuring the coated product. The specific kind and thickness of the substrate are not particularly limited, and a substrate known to be used in the manufacture of a low refractive index layer or an antireflection film can be used without particular limitation.

The method and apparatus commonly used for coating the photocurable coating composition can be used without particular limitation. For example, a bar coating method, such as Meyer bar or the like, a gravure coating method, a 2-roll reverse coating method, a vacuum slot die coating method, a 2-roll coating method, or the like can be used.

The low refractive index layer may have a thickness of 1 nm to 300 nm, or 50 nm to 200 nm. Accordingly, the thickness of the photocurable coating composition coated onto the predetermined substrate can be about 1 nm to 300 nm, or from 50 nm to 200 nm.

In the step of photocuring the photocurable coating composition, an ultraviolet light or visible light having a wavelength of 200 nm to 400 nm can be irradiated, and the amount of exposure is preferably 100 mJ/cm$^2$ to 4,000 mJ/cm$^2$. The exposure time is not particularly limited, and can be appropriately varied depending on the exposure apparatus used, the wavelength of the irradiated light or the amount of exposure.

Further, in the step of photocuring the photocurable coating composition, nitrogen purging or the like may be performed to apply nitrogen atmosphere conditions.

Specific details regarding the photocurable compound, the hollow inorganic nanoparticles, the solid-type inorganic nanoparticles and the fluorine-containing compound containing a photoreactive functional group include the above-described details of the antireflection film of one embodiment.

Each of the hollow inorganic nanoparticles and the solid-type inorganic nanoparticles may be included in a composition as a colloidal phase dispersed in a predetermined dispersion medium. Each colloidal phase including the hollow inorganic nanoparticles and the solid-type inorganic nanoparticles may include an organic solvent as a dispersion medium.

Considering the content range of each of the hollow inorganic nanoparticles and the solid-type inorganic nanoparticles in the photocurable coating composition and the viscosity of the photocurable coating composition, etc., the content of each of the hollow inorganic nanoparticles and the solid-type inorganic nanoparticles in the colloidal phase may be determined, and for example, the solid content of each of the hollow inorganic nanoparticles in the colloidal phase and the solid-type inorganic nanoparticles in the colloidal phase may be 5% by weight to 60% by weight.

Herein, examples of the organic solvent in the dispersion medium include alcohols such as methanol, isopropyl alcohol, ethylene glycol butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butylolactone, and the like; ethers such as tetrahydrofuran, 1,4-dioxane, and the like; or a mixture thereof.

As the photopolymerization initiator, any compound known to be used in a photocurable resin composition may be used without particular limitation. Specifically, a benzophenone-based compound, an acetophenone-based based compound, a nonimidazole-based compound, a triazine-based compound, an oxime-based compound, a mixture of two or more thereof may be used.

The photopolymerization initiator may be used in an amount of 1 to 100 parts by weight relative to 100 parts by weight of the photopolymerizable compound. If the amount of the photopolymerization initiator is too small, the photopolymerization initiator is uncured in the photocuring step of the photocurable coating composition to generate a residual material. If the amount of the photopolymerization initiator is too large, the unreacted initiator may remain as impurities or the crosslinking density may be lowered, and thus the mechanical properties of the resulting film may be deteriorated, or the reflectivity may be greatly increased.

Meanwhile, the photocurable coating composition may further include an organic solvent.

Non-limiting examples of the organic solvent include ketones, alcohols, acetates and ethers, or a mixture of two or more thereof.

Specific examples of such organic solvent include ketones such as methyl ethyl ketone, methyl isobutyl ketone, acetylacetone or isobutyl ketone; alcohols such as methanol, ethanol, diacetone alcohol, n-propanol, i-propanol, n-butanol, i-butanol or t-butanol; acetates such as ethyl acetate, i-propyl acetate, or polyethylene glycol monomethyl ether acetate; ethers such as tetrahydrofuran and propylene glycol monomethyl ether; or a mixture of two or more thereof.

The organic solvent may be added at the time of mixing the respective components contained in the photocurable coating composition, or may be added to the photocurable coating composition as the respective components are added in a state of being dispersed or mixed in the organic solvent. If the content of the organic solvent in the photocurable coating composition is too small, the flowability of the photocurable coating composition may be reduced, resulting in defects, such as generation of stripes in the finally manufactured film, or the like. Further, if the organic solvent is added in excess, the solid content is lowered, and the physical properties and surface properties of the film may be deteriorated due to insufficient coating and film formation, and defects may occur during the drying and curing processes. Accordingly, the photocurable coating composition may include an organic solvent such that the concentration of the total solids of the components contained is 1% by weight to 50% by weight, or 2% by weight to 20% by weight.

The hard coating layer can be used without limitation as long as it is a material known to be used for an antireflection film.

Specifically, the manufacturing method of the antireflection film may further include coating a polymer resin composition for forming a hard coating layer including a photocurable compound or a (co)polymer thereof, a photoinitiator and an antistatic agent onto a substrate and photocuring the same, and a hard coating layer can be formed through the above steps.

The components used for the formation of the hard coating layer are as described above with respect to the antireflection film of one embodiment.

In addition, the polymer resin composition for forming a hard coating layer may further include at least one compound selected from the group consisting of an alkoxysilane-based oligomer and a metal alkoxide-based oligomer.

The method and apparatus commonly used for coating the polymer resin composition for forming a hard coating layer can be used without particular limitation. For example, a bar coating method, such as Meyer bar or the like, a gravure coating method, a 2-roll reverse coating method, a vacuum slot die coating method, a 2-roll coating method, or the like can be used.

In the step of photocuring the polymer resin composition for forming a hard coating layer, an ultraviolet light or visible light having a wavelength of 200 to 400 nm can be irradiated, and the amount of exposure is preferably 100 to 4,000 mJ/cm$^2$. The exposure time is not particularly limited, and can be appropriately varied depending on the exposure apparatus used, the wavelength of the irradiated light or the amount of exposure. Further, in the step of photocuring the polymer resin composition for forming a hard coating layer, nitrogen purging or the like may be performed to apply nitrogen atmosphere conditions.

BRIEF DESCRIPTION OF DRAWINGS

FIG. 1 is a cross-sectional TEM image of the hollow silica nanoparticles of Example 1.

FIG. 2 is a cross-sectional TEM image of the hollow silica nanoparticles of Comparative Example 1.

FIG. 3 is a cross-sectional TEM image of the hollow silica nanoparticles of Comparative Example 2.

FIG. 4 is a cross-sectional TEM image of the antireflection film of Example 1.

DETAILED DESCRIPTION OF THE EMBODIMENTS

Hereinafter, the present invention will be described in more detail by way of Examples. However, these Examples are given for illustrative purposes only, and the scope of the invention is not intended to be limited by these Examples.

PREPARATION EXAMPLE

Preparation of Hard Coating Film

A salt-type antistatic hard coating solution manufactured by KYOEISHA Chemical Co., Ltd (50% by weight of solid content, product name: LJD-1000) was coated onto a triacetyl cellulose film with a #10 meyer bar, dried at 90° C. for 1 minute, and then irradiated with an ultraviolet light of 150 mJ/cm$^2$ to prepare a hard coating film having a thickness of about 5 to 6 μm.

Examples 1 to 4

Preparation of Antireflection Films (1) Preparation of Photocurable Coating Composition for Forming Low Refractive Index Layer Pentaerythritol triacrylate (PETA), hollow silica nanoparticles (radius: about 35 to 38 nm, shell thickness: 7 to 9 nm, shell thickness/radius: 0.21 to 0.29, density: 1.40 g/cm$^3$, manufactured by JSC Catalyst and Chemicals), solid-type silica nanoparticles (radius: about 12 nm, density: 2.65 g/cm$^3$), fluorine-containing compound (RS-537, manufactured by DIC), initiator (Irgacure 127, manufactured by Ciba) were diluted in MIBK (methyl isobutyl ketone) solvent in the weight ratio shown in Table 1 below, relative to 100 parts by weight of total solid content.

(2) Preparation of Low Refractive Index Layer and Antireflection Film

The photocurable coating composition obtained above was coated onto the hard coating film of the Preparation Example with a #4 meyer bar to have a thickness of about 110 to 120 nm, and dried and cured at a temperature of 60° C. for 1 minute. At the time of curing, an ultraviolet light of 252 mJ/cm$^2$ was irradiated to the dried coating product under nitrogen purging.

TABLE 1

| Category | Solid content weight ratio of the coating composition of Examples (unit: parts by weight) | | | |
|---|---|---|---|---|
| | Example 1 | Example 2 | Example 3 | Example 4 |
| Pentaerythritol triacrylate | 7 | 12 | 16 | 20 |
| Hollow silica nanoparticles | 60 | 55 | 45 | 35 |
| Solid-type silica nanoparticles | 8 | 8 | 10 | 20 |
| Fluorine-containing compound | 22 | 22 | 24 | 19 |
| Initiator | 3 | 3 | 5 | 6 |

COMPARATIVE EXAMPLES 1 to 3

Preparation of Antireflection Films

Comparative Example 1

An anti-reflection film was prepared in the same manner as in Example 1, except that hollow silica nanoparticles having a radius of about 22 nm to 25 nm, a shell thickness of 7 nm to 9 nm, a shell thickness/radius of 0.32 to 0.45, and a density of 1.86 g/cm$^3$ (manufactured by JSC Catalyst and Chemicals) were used.

Comparative Example 2

An anti-reflection film was prepared in the same manner as in Example 1, except that hollow silica nanoparticles having a radius of about 19 nm to 22 nm, a shell thickness of 7 nm to 9 nm, a shell thickness/radius of 0.36 to 0.53, and a density of 2.07 g/cm$^3$ (manufactured by JSC Catalyst and Chemicals) were used.

Comparative Example 3

An anti-reflection film was prepared in the same manner as in Example 3, except that hollow silica nanoparticles having a radius of about 22 nm to 25 nm, a shell thickness of 7 nm to 9 nm, a shell thickness/radius of 0.32 to 0.45, and a density of 1.86 g/cm$^3$ (manufactured by JSC Catalyst and Chemicals) were used.

EXPERIMENTAL EXAMPLES

Measurement of Physical Properties of Antireflection Films

The following experiments were conducted for the antireflection films obtained in the Examples and Comparative Examples.

Experimental Example 1

Measurement of Average Reflectivity of Antireflection Films

The average reflectivity of the antireflection films obtained in Examples and Comparative Examples in the visible light range (380 to 780 nm) was measured using Solidspec 3700 (SHIMADZU) equipment.

Experimental Example 2

Measurement of Antifouling Property

A straight line with a length of 5 cm was drawn with a black permanent marker on the surface of the antireflection films obtained in Examples and Comparative Examples. Then, the number of times of erasures was confirmed when rubbed with a nonwoven cloth, and the antifouling property was measured.

<Measurement Criteria>

O: The number of times of erasures is less than 10

Δ: The number of times of erasures is between 11 to 20

X: The number of times of erasures exceeds 20

Experimental Example 3

Measurement of Scratch Resistance

The surface of the antireflection films obtained in the Examples and Comparative Examples was rubbed back and forth 10 times with a steel wool under a load at a speed of 27 rpm. The scratch resistance was evaluated by confirming the maximum load at which a scratch of 1 cm or less observed with the naked eye was 1 or less.

TABLE 2

Results of Experimental Examples 1 to 3

| Category | Average Reflectivity (%) | Scratch Resistance(g) | Antifouling Property |
|---|---|---|---|
| Example 1 | 0.30 | 150 | O |
| Example 2 | 0.35 | 150 | O |
| Example 3 | 0.52 | 350 | O |
| Example 4 | 0.80 | 400 | O |
| Comparative Example 1 | 0.40 | 150 | O |
| Comparative Example 2 | 0.75 | 150 | O |
| Comparative Example 3 | 0.80 | 350 | O |

As shown in Table 2, in the anti-reflection film of Example 1, the ratio of the thickness of the shell layer 2 to the particle radius in the low refractive index layer was measured to be 0.21 to 0.29, and it includes hollow silica nanoparticles satisfying the ratio of 0.3 or less, and accordingly it is possible to implement high scratch resistance and antifouling property simultaneously while exhibiting low reflectivity of 0.30% in the visible light range.

In contrast, in the low refractive index layer of the antireflection films of Comparative Examples 1 and 2, the ratio of the thickness of the shell layer 2 to the particle radius in the low refractive index layer was measured to be 0.32 to 0.53, and it includes hollow inorganic nanoparticles satisfying the ratio exceeding 0.3, and accordingly, it can be confirmed that the reflectivity in the visible light range were 0.40% and 0.75%, respectively, which was increased compared to Example 1.

In addition, when the antireflection film obtained in Example 4, in which the ratio of the thickness of the shell layer 2 to the particle radius of the hollow inorganic nanoparticles was 0.3 or less, and the antireflection film obtained in Comparative Example 3, in which the ratio of the thickness of the shell layer 2 to the particle radius of the hollow inorganic nanoparticles exceeded 0.3, were compared, both had the same average reflectivity of 0.80%, but the scratch resistance in Example 4 was measured to be 400 g, and thus it can be confirmed that the scratch resistance was improved compared to Comparative Example 3, which showed the scratch resistance of 300 g.

Accordingly, when the radius of the hollow silica nanoparticles included in the low refractive index layer is increased and the shell thickness is reduced as in the Examples, the reflectivity in the visible light range is reduced, thereby implementing excellent antireflection properties, and at the same time, it is possible to implement the scratch resistance and antifouling property equivalent to or higher than those of the Comparative Examples.

Meanwhile, when Examples 1 to 4 were compared, as the weight ratio of the hollow silica nanoparticles decreased from Example 1 to Example 4, and the weight ratio of the solid-type silica nanoparticles increased, there was a tendency that the reflectivity in the visible light range gradually increased, thereby deteriorating the antireflection characteristics and increasing the scratch resistance.

The invention claimed is:

1. An antireflection film comprising:
a hard coating layer; and
a low refractive index layer which is formed on one surface of the hard coating layer and includes a binder resin, and hollow inorganic nanoparticles and solid-type inorganic nanoparticles dispersed in the binder resin,
wherein at least 70% by volume of a total number of solid-type inorganic nanoparticles exists within 50% of a total thickness of the low refractive index layer from an interface between the hard coating layer and the low refractive index layer, and
wherein a ratio of a thickness of a shell layer of the hollow inorganic particles to a particle radius of the hollow inorganic particles is 0.3 or less, according to the following Equation 1:

Ratio of the thickness of the shell layer of the hollow inorganic nanoparticles to the particle radius of the hollow inorganic nanoparticles= (Thickness of the shell layer of the hollow inorganic nanoparticles)/(Radius of the hollow inorganic nanoparticles).  [Equation 1]

2. The antireflection film of claim 1, wherein the thickness of the shell layer of the hollow inorganic nanoparticles is 0.1 nm to 60 nm.

3. The antireflection film of claim 1, wherein the particle radius of the hollow inorganic nanoparticles is 35 nm to 100 nm.

4. The antireflection film of claim 1, wherein at least 30% by volume of a total number of hollow inorganic nanoparticles exists farther from the interface between the hard coating layer and the low refractive index layer than the total number of solid-type inorganic nanoparticles in a thickness direction of the low refractive index layer.

5. The antireflection film of claim 1, wherein at least 70% by volume of the total number of solid-type inorganic nanoparticles exists within 30% of the total thickness of the low refractive index layer from the interface between the hard coating layer and the low refractive index layer.

6. The antireflection film of claim 5, wherein at least 70% by volume of a total number of hollow inorganic nanoparticles exists in a region where the total thickness of the low refractive index layer exceeds by 30% from the interface between the hard coating layer and the low refractive index layer.

7. The antireflection film of claim 1, wherein the low refractive index layer comprises a first layer including at least 70% by volume of the total number of solid-type inorganic nanoparticles and a second layer including at least 70% by volume of a total number of hollow inorganic nanoparticles, and
wherein the first layer is positioned closer to the interface between the hard coating layer and the low refractive index layer than the second layer.

8. The antireflection film of claim 1, wherein the antireflection film exhibits an average reflectivity of 0.8% or less in a visible light wavelength range of 380 nm to 780 nm.

9. The antireflection film of claim 1, wherein a density of the solid-type inorganic nanoparticles is 0.50 g/cm³ or more higher than a density of the hollow inorganic nanoparticles.

10. The antireflection film of claim 1, wherein the solid-type inorganic nanoparticles have a radius of 0.5 nm to 100 nm.

11. The antireflection film of claim 1, wherein the binder resin included in the low refractive index layer comprises a crosslinked (co)polymer between a (co)polymer of a photopolymerizable compound and a fluorine-containing compound containing a photoreactive functional group.

12. The antireflection film of claim 1, wherein the hard coating layer comprises a binder resin including a photocurable resin; and an antistatic agent dispersed in the binder resin.

13. The antireflection film of claim 1, further comprising a substrate bonded to an other surface of the hard coating layer.

14. A method for manufacturing the antireflection film of claim 1, the method comprising the steps of: coating a resin composition for forming a low refractive index layer including a photocurable compound or a (co)polymer thereof, a fluorine-containing compound containing a photoreactive functional group, a photoinitiator, hollow inorganic nanoparticles and solid-type inorganic nanoparticles onto a hard coating layer and drying at a temperature of 35° C. to 100° C. to obtain a dried product; and photocuring the dried product, wherein ratio of a thickness of a shell layer of the hollow inorganic nanoparticles to a particle radius of the hollow inorganic particles is 0.3 or less according to the following Equation 1:

Ratio of thickness of the shell layer to radius of the hollow inorganic nanoparticles=(Thickness of the shell layer of the hollow inorganic nanoparticles)/(Radius of the hollow inorganic nanoparticles). [Equation 1]

15. The method for manufacturing the antireflection film of claim 14, wherein the thickness of the shell layer of the hollow inorganic nanoparticles is 0.1 nm to 60 nm.

16. The method for manufacturing the antireflection film of claim 14, wherein the resin composition coated on the hard coating layer is dried at a temperature of 40° C. to 80° C.

17. The method for manufacturing the antireflection film of claim 14, wherein the step of drying the resin composition coated on the hard coating layer at a temperature of 35° C. to 100° C. is performed for 10 seconds to 5 minutes.

18. The method for manufacturing the antireflection film of claim 14, wherein a density of the solid-type inorganic nanoparticles is 0.50 g/cm³ or more higher than a density of the hollow inorganic nanoparticles.

19. The method for manufacturing the antireflection film of claim 14, wherein the solid-type inorganic nanoparticles have a density of 2.00 g/cm³ to 4.00 g/cm³, and the hollow inorganic nanoparticles have a density of 1.20 g/cm³ to 3.50 g/cm³.

20. The method for manufacturing the antireflection film of claim 14, further comprising coating a polymer resin composition for forming a hard coating layer including a photocurable compound or a (co)polymer thereof, a photoinitiator and an antistatic agent onto a substrate and photocuring the same.

* * * * *